(12) United States Patent
Li et al.

(10) Patent No.: US 11,004,240 B2
(45) Date of Patent: May 11, 2021

(54) HIERARCHICAL DIVISION-BASED POINT CLOUD ATTRIBUTE COMPRESSION METHOD

(71) Applicant: Peking University Shenzhen Graduate School, Guangdong (CN)

(72) Inventors: Ge Li, Guangdong (CN); Yi Ting Shao, Guangdong (CN); Qi Zhang, Guangdong (CN); Rong Gang Wang, Guangdong (CN); Tie Jun Huang, Guangdong (CN); Wen Gao, Guangdong (CN)

(73) Assignee: Peking University Shenzhen Graduate School

( * ) Notice: Subject to any disclaimer, the term of this patent is extended or adjusted under 35 U.S.C. 154(b) by 0 days.

(21) Appl. No.: 16/626,907

(22) PCT Filed: May 15, 2018

(86) PCT No.: PCT/CN2018/086790
§ 371 (c)(1),
(2) Date: Dec. 27, 2019

(87) PCT Pub. No.: WO2019/213985
PCT Pub. Date: Nov. 14, 2019

(65) Prior Publication Data
US 2020/0151915 A1    May 14, 2020

(30) Foreign Application Priority Data

May 9, 2018 (CN) .......................... 201810435403.7

(51) Int. Cl.
*G06T 9/40* (2006.01)
*G06T 7/90* (2017.01)
*G06T 7/60* (2017.01)

(52) U.S. Cl.
CPC .................. *G06T 9/40* (2013.01); *G06T 7/60* (2013.01); *G06T 7/90* (2017.01); *G06T 2207/10028* (2013.01)

(58) Field of Classification Search
CPC .... G06T 9/40; G06T 7/90; G06T 7/60; G06T 17/005; G06T 2207/10028
See application file for complete search history.

(56) References Cited

U.S. PATENT DOCUMENTS 6,563,500 B1 * 5/2003 Kim ........................ G06T 9/001
                                                                345/419
8,687,686 B2   4/2014 Lee et al.
(Continued)

FOREIGN PATENT DOCUMENTS

CN    103077549 A    5/2013
CN    107403456      11/2017

OTHER PUBLICATIONS

International Search Report from PCT Application No. PCT/CN2018/086790 dated Feb. 3, 2019, pp. 1-7, including English translation.

*Primary Examiner* — Said Broome
(74) *Attorney, Agent, or Firm* — The Belles Group, P.C.

(57) ABSTRACT

Disclosed is a hierarchical division-based point cloud attribute compression method. For point cloud attribute information, a new hierarchical division based coding scheme is proposed, wherein a frame of point cloud is adaptively divided into a "stripe-macroblock-block" hierarchical structure according to the spatial position and color distribution of the point cloud, and stripes are coded independently from one another, increasing the coding efficiency, enhancing the fault tolerance of a system and improving the performance of point cloud attribute compression. The method comprises: (1) inputting a point cloud; (2) division of a k-dimension (KD) tree structure of the point cloud; (3) continuity analysis of point cloud attribute information; (4) stripe (Continued)

division of the point cloud; (5) division of macroblocks and coding blocks of the point cloud; and (6) intra-frame prediction, transformation, quantification and entropy coding based on a block structure.

7 Claims, 5 Drawing Sheets

(56) References Cited

U.S. PATENT DOCUMENTS

| | | | |
|---|---|---|---|
| 2008/0231633 A1* | 9/2008 | Keller | G06T 15/06 345/426 |
| 2009/0256845 A1* | 10/2009 | Sevastianov | G06T 15/40 345/426 |
| 2010/0239178 A1* | 9/2010 | Osher | G06T 9/001 382/243 |
| 2011/0010400 A1* | 1/2011 | Hayes | H03M 7/3059 707/803 |
| 2014/0250120 A1* | 9/2014 | Mei | G06F 16/5854 707/736 |
| 2019/0355152 A1 | 11/2019 | Li et al. | |

* cited by examiner

Fig. 1

- Frames — A static point cloud
- Strips — Portions of the partitioned point cloud
- Macro-blocks — Consisting of two blocks; 2 luminance, 4 chrominance
- Blocks — A minimum partitioning unit consisting of a plurality of points; 1 luminance, 2 chrominance

HIERARCHICAL DIVISION-BASED POINT CLOUD ATTRIBUTE COMPRESSION METHOD

CROSS-REFERENCE TO RELATED PATENT APPLICATIONS

The present application is a U.S. national stage application under 35 U.S.C. § 371 of PCT Application No. PCT/CN2018/086790, filed May 15, 2018, which claims priority to Chinese Patent Application No. 2018104354037, filed May 9, 2018. The disclosures of the aforementioned priority applications are incorporated herein by reference in their entireties.

FIELD OF THE INVENTION

The invention belongs to the technical field of point cloud data processing, and relates to a point cloud data compression method, in particular to a point cloud attribute compression method based on hierarchical partition.

BACKGROUND OF THE INVENTION

Three-dimensional point cloud is an important form of digital representation in the real world. With the rapid development of three-dimensional scanning equipment (laser, radar, etc.), the precision and resolution of point cloud are higher. High-precision point cloud is widely used in urban digital map construction, and plays a technical support role m many hot research such as smart city, unmanned, cultural relics protection and so on. The point cloud is obtained by sampling the surface of an object by a three-dimensional scanning device, the number of points of a frame of point cloud is generally millions of levels, each point contains geometric information, color, texture and other attribute information, and the data volume is very large. The huge data volume of three-dimensional point cloud brings great challenges to data storage and transmission, so point cloud compression is very necessary.

The point cloud compression is mainly divided into geometric compression and attribute compression, and the existing point cloud attribute compression framework mainly comprises:

I. A method based on octree decomposition and DCT comprises the following steps: firstly, carrying out spatial decomposition on the point cloud by using an octree to obtain a coded block, then carrying out depth-first traversal on the tree, writing traversed node color values into a two-dimensional JPEG table according to a serpentine sequence, and then encoding the obtained point cloud color table by using an existing JPEG encoder, wherein the JPEG encoder uses DCT. According to the method, an existing encoder is utilized, the calculation complexity is low, but the spatial correlation between points is not fully utilized, and the compression performance needs to be improved;

II. A method based on octree decomposition and graph transformation comprises the following steps: firstly, performing spatial decomposition on the point cloud by using an octree, and partitioning the point cloud into specific layers to obtain a transformation block; forming a graph in each transformation block, connecting two points with the distance not exceeding 1 along any coordinate axis by one side, wherein the weight of the side is inversely proportional to the Euclidean distance; and then carrying out graph transformation on the attribute information of the nodes in the graph. The compression performance of the method is good; however, the operation complexity is high, the composition mode can bring subpicture problems, influence the efficiency of graph transformation, and thus there is still a lot to be improved;

III. A method based on KD tree decomposition and graph transformation comprises the following steps: firstly, performing spatial decomposition on a point cloud by using a KD tree, and partitioning the point cloud into transformation blocks to a certain depth to obtain transformation blocks, wherein the number of points contained in each transformation block is approximately the same; in the transformation block, every two points are connected by a side, the weight of the side is related to the Euclidean distance, and the set Euclidean distance threshold of the side determines the sparsity of the graph; and then carrying out graph transformation on the attribute information of the points in the graph. The method completely solves the subpicture problem, meanwhile, the compression performance is greatly improved compared with the former two methods, but the operation complexity is high, and the performance still needs to be improved.

SUMMARY OF THE INVENTION

In order to overcome the defects of the prior art and further improve the compression performance of point cloud attributes under the condition of considering the computational complexity, the invention provides a point cloud attribute compression method based on hierarchical partition, wherein a frame of point cloud is adaptively partitioned into a "strip-macro-block-block" hierarchy according to the spatial position and color distribution of the point cloud, each strip is independently coded, the coding efficiency is improved, the fault tolerance of a system is enhanced, and the compression performance of the point cloud attributes is improved. The technical scheme provided by the invention is as follows:

The invention relates to a point cloud attribute compression method based on hierarchical partition, aiming at point cloud data, a frame of point cloud is adaptively partitioned into a "strip-macro-block-block" hierarchy by comprehensively utilizing spatial position and color information of the point cloud, so that points with similar colors and related spatial positions are gathered within one strip, macro block or coded block as much as possible, the redundancy of attribute information between adjacent points is conveniently fully utilized, and the compression performance of the point cloud attribute is improved; meanwhile, each strip is independently coded, coding efficiency is improved, accumulation and diffusion of coding errors are prevented, and fault tolerance of a system is enhanced; the method comprises the following steps:

1) Inputting a Point Cloud:

Reading geometric information and attribute information of the point cloud to be processed for subsequent processing.

2) Partitioning A Point Cloud KD Tree:

Carrying out KD tree partition on the point cloud according to the geometric information, selecting a coordinate axis with the largest distribution variance in the position coordinate of the point cloud at each time as a partition axis, selecting a point with the coordinate size being a median value as a partition point, iteratively partitioning until the set KD tree depth is reached, and obtaining coded block units with almost the same number of points after KD tree partition.

3) Continuity Analysis of the Point Cloud Attribute Information:

Obtaining coded blocks after KD tree partition, calculating variance of color values in each block according to attribute information to judge whether the block is a flat block or not, analyzing continuity of point cloud attribute information by calculating the proportion of the flat block to all block numbers, and judging whether strip-partitioning is carried out or not.

4) Strip-Partitioning The Point Cloud:

If the continuity of the attribute information of the point cloud is judged to be poor in the step 3), partitioning a plurality of strips, otherwise, one frame of point cloud is one strip. And setting corresponding partition conditions according to different application scenes and performance requirements, and partitioning a frame of point cloud into a plurality of independently coded strips.

5) Partitioning Macro Blocks and Coded Blocks of the Point Cloud:

Carrying out KD tree partition on each strip according to the geometric information, selecting a coordinate axis with the maximum distribution variance in the point cloud position coordinate as a partition axis each time, selecting a point with the coordinate size being a median value as a partition point, and iteratively partitioning until the set KD tree depth is reached; a block obtained by the last layer of KD tree partition is a coded block of the point cloud. Numbering the coded blocks according to a breadth traversal sequence, and the numbering is used as a sequence for later processing of the coded blocks; the block obtained on the upper layer of the root node partitioned by the KD tree is a macro block of a point cloud, and one macro block is a parent node of two coded blocks.

6) Intra-Frame Prediction, Transformation, Quantization and Entropy Coding:

Processing all coded blocks according to the coding sequence, transforming, uniformly quantizing and entropy coding the predicted residual error to obtain a final code stream compressed by the point cloud attribute;

The point KD tree partitioning method in the step 2) is a binary partitioning method; setting N points of the point cloud to be processed, wherein the partition depth set by the KD tree is d, and obtaining $2^d$ blocks after the point cloud is partitioned d times; and numbering all coded blocks by $b_1, b_2, \ldots, b_i, \ldots, b_{2^d}$ in an order of breadth traversal.

The method for analyzing the continuity of the point cloud attribute information in the step 3) comprises the following steps: traversing and calculating the variance var (i) of the color values Ri, Gi, Bi in each block $b_i$ according to the breadth sequence. Taking R as an example, firstly calculating the mean value $\overline{R}_i$, of the R color components of N points in the block $b_i$ by using formula 1, and then calculating to obtain the variance var(i)_$R_1$ of the R of the block $b_i$ by using formula 2; by the same reasoning between G and B, obtaining var(i)_$R_1$, var(i)_$G_1$, var(i)_$B_1$ and comparing them with the threshold of continuity thres_1. If var (i) of the three color components is greater than thres_1, it is determined that $b_i$ is a non-flat block, otherwise $b_i$ is a flat block. Meanwhile, recoding the number of the non-flat blocks, and obtaining the number num of the non-flat blocks in all the blocks after finishing traversal. Partitioning the number num of non-flat blocks in all blocks by the total number $2^d$ to yield a proportion of $(num1)/(2^d)$ which the non-flat block accounts for, i.e., ratio. Comparing ratio to threshold thres_2: if $(num1)/(2^d)$ is greater than thres_2, the consistency of the attribute information of the point cloud is poor, and strip-partitioning is needed; on the contrary, it shows that the consistency of point cloud attribute information is good, and no strip-partitioning is needed.

$$\overline{R}_i = \frac{1}{N} \sum_{n=1}^{N} R_{in} \quad \text{(Formula 1)}$$

$$\text{var}(i)\_R = \frac{1}{N} \sum_{n=1}^{N} (R_{in} - \overline{R}_i)^2 \quad \text{(Formula 2)}$$

Partitioning the strip structure of the point cloud in the step 4), including but not limited to the following scheme: traversing attribute information for all points in the point cloud, partitioning the point with similar attribute information in the point cloud into strips, classifying the point into strips 1 if the color values R, G and B of the point are less than 65, and classifying the point into strips 2 if the color values R, G and B of the point are greater than or equal to 65, by which the original point cloud is partitioned into two strips; according to requirements of different applications and requirements of different types of point cloud processing, a frame of point cloud can be partitioned into a plurality of strips based on a hierarchical partition scheme. The KD tree partitioning method in the step 5) is a binary partitioning method; setting N points of the point cloud to be processed, wherein the partition depth set by the KD tree is d, and obtaining $2^d$ blocks after partitioning the point cloud d times; numbering all coded blocks by $b_1, b_2, \ldots, b_i, \ldots, b_{2^d}$ in an order of breadth traversal.

The relation between the macro block and the coded block in the step 5) is as follows: each macro block can be continuously partitioned into two coded blocks, and the two coded blocks are called sub-blocks thereof; at the same time the two adjacent coded blocks have the same parent block, i.e. the two coded blocks constitute a macro-block.

The generation of the point cloud attribute compressed code stream in the step 6) is as follows:

(4-1) independently inputting each strip into a point cloud attribute compression encoder based on intra-frame prediction, transformation, quantization and entropy coding through processing in the steps 1) to 4). Obtaining coded blocks with numbers and macro blocks which can be selectively used in the encoder through the step 5); obtaining prediction residual error and further prediction mode information of the prediction residual error through prediction; transforming, uniformly quantizing and binarizing the prediction residual error to obtain a code stream of attribute information, combining prediction mode information of the coded block, and entropy coding to obtain a final point cloud attribute compressed code stream;

(4-2) The code stream based on the hierarchically partitioned point cloud attribute information is mainly composed of the point cloud attribute information of each strip, wherein the point cloud attribute information of each strip is composed of compressed header information and coded block information. The header information mainly comprises quantization step length and the like; the coded block information stream is arranged in the order of coded blocks in units of coded blocks, and each block mainly comprises prediction mode information and color residual information of the coded blocks.

(4-3) The performance of point cloud attribute compression is measured by bit rate and PSNR (Peak Signal to Noise Ratio), wherein the bit rate is in bpp (bits per point) and PSNR is in decibel dB; the smaller the bit rate, the larger the PSNR, the better the compression performance of point cloud attribute.

Compared with the prior art, the invention has the beneficial effects that:

The invention provides a point cloud attribute compression method based on hierarchical partition, which has the following technical advantages:

(I) The spatial position and the color information of the point cloud are comprehensively utilized, one frame of point cloud is partitioned into a "strip-macro-block-block" hierarchy, the colors are as close as possible, and the points related to the spatial position are gathered in one strip, macro-block or coded block, so that the redundancy of attribute information between adjacent points can be fully utilized, and the attribute compression performance of the point cloud is improved.

And (II) each strip is independently coded, random access is supported, codling efficiency is improved, accumulation and diffusion of coding errors are prevented, and fault tolerance of the system is enhanced.

BRIEF DESCRIPTION OF THE DRAWINGS

FIGS. 3a and b are example diagrams of point cloud strip-partitioning, wherein.

FIG. 3a tests Shiva_00035_vax12.ply;

FIG. 3b tests Sarah.pl.

FIGS. 5a, b and c are graphs comparing the compression performance of the process according to the invention with that of a conventional process according to the prior art, wherein.

FIG. 5a tests Facade_00015_vox14.ply;

FIG. 5b tests Shiva_00035_vox12.ply;

FIG. 5c tests Queen_frame_0200.ply.

PREFERRED EMBODIMENTS

Figure 1:
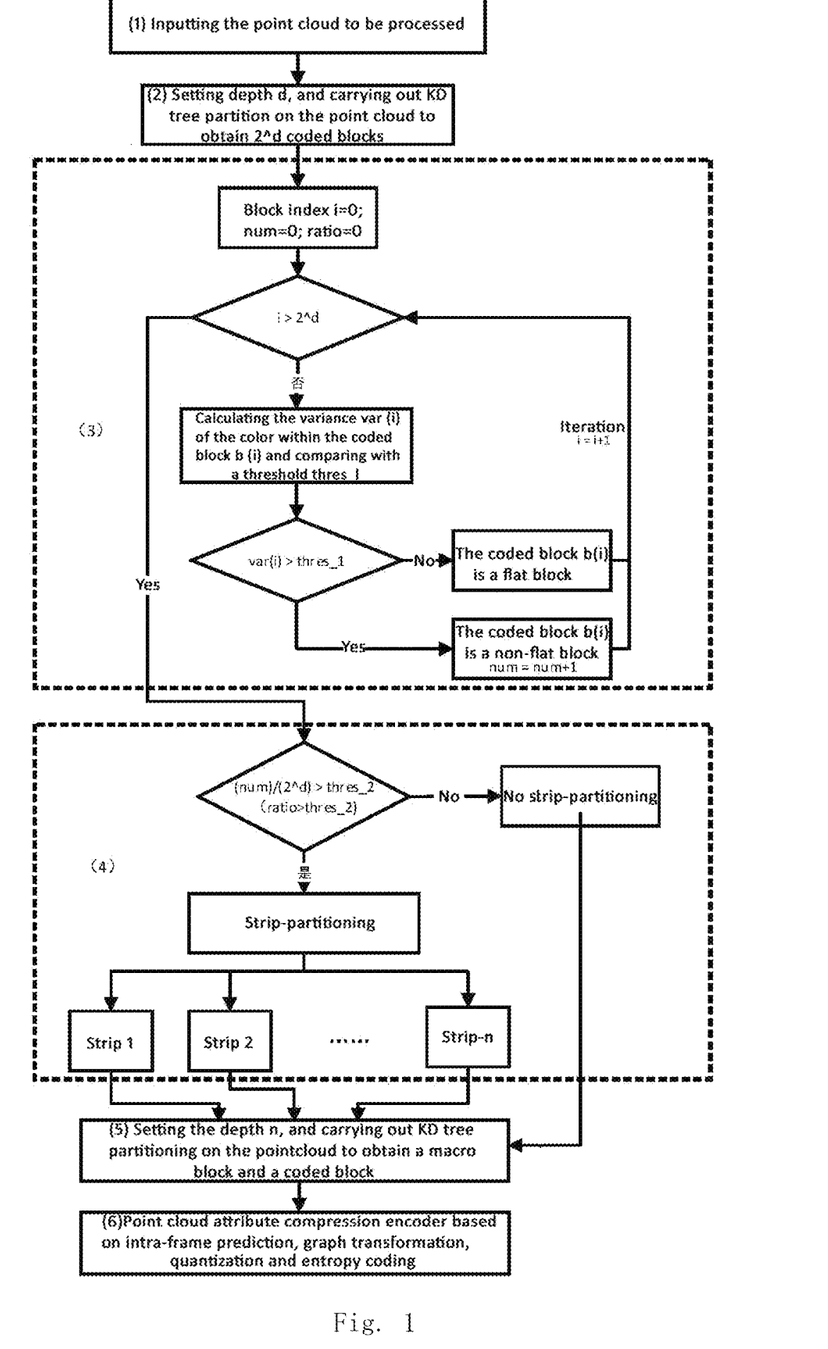
FIG. 1 is a flow diagram of a method provided by the present invention.

The invention will now be further described, by way of example, with reference to the accompanying drawings, which do not limit the scope of the invention in any way. According to the point cloud attribute compression method based on the hierarchical partition, aiming at the point cloud data, a new point cloud attribute compression method based on the hierarchical partition is provided, the spatial position and the color information of the point cloud are comprehensively utilized, one frame of point cloud is partitioned into a "strip-macro-block-block" hierarchy, and the compression performance of the point cloud attribute is improved; FIG. 1 is a flow diagram of the method of the present invention. The following is aiming at the official point cloud data set Facade_00015_vox14.ply, Shiva_00035_vox12.ply; Queen_frame_0200.ply in the MPEG point cloud compression working group, point cloud attribute compression is carried out by adopting the method provided by the invention, and the specific implementation steps are as follows:

(1) Point cloud KD Tree Partition and Continuity Analysis of Coded Block Attribute Information: Facade_00015_vox14.ply is taken as an example, there are 279664 points, KD-tree partition depth d is set to 11, after partition, there are $2^d=2048$ blocks, the number of points in the block is 136 or 137. A coded block index i=0 is taken as a starting block, all coded blocks are calculated, the number num of non-flat blocks and the proportion (i.e. ratio) that the non-flat blocks accounts for all the blocks are calculated, and the continuity of each coded block is estimated. The variance of the color values R, G, B in each block is calculated. The first block is taken as an example, the variance values $var(1)\_R_1$, $var(1)\_G_1$, $var(1)\_B_1$ of R, G, B are 751.15125, 592.85834, 577.31110 respectively, and the variance threshold thres_1 is set to 1000. When var(1) of the three color components is less than thres_1, the block is a flat block; after all 2048 blocks are traversed and calculated, there are 86 flat blocks, the total number of blocks is 2048, the proportion by which the non-flat block accounts for is about 0.04, the ratio thres_2 is set to 0.01, the proportion by which the non-flat block accounts for is greater than thres_2, which indicates that the consistency of the attribute information of the point cloud is poor, and the strip-partitioning is needed.

Figure 2:
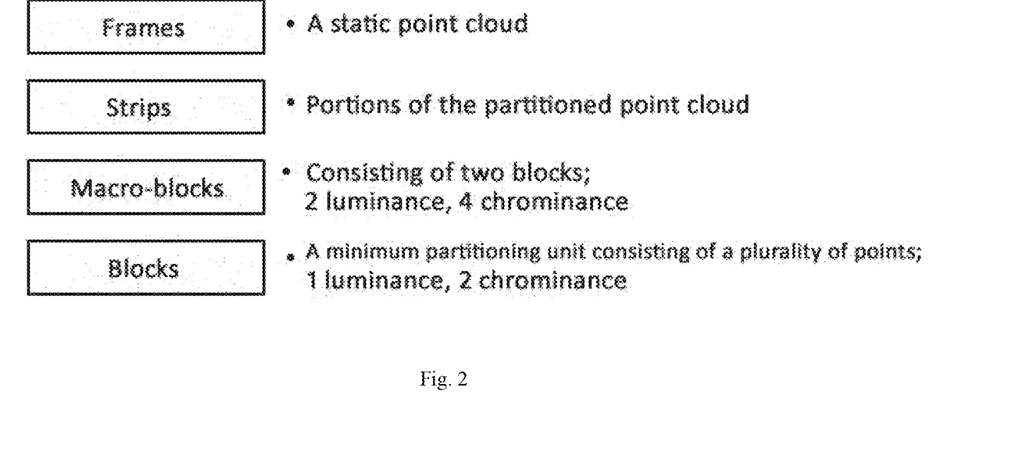
FIG. 2 is an example diagram of a "strip-macro-block-block" hierarchy of point clouds.
Figure 3A:
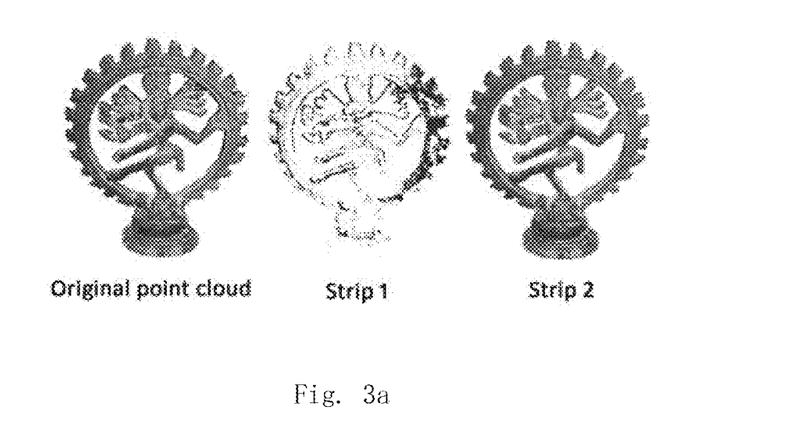
Figure 3B:
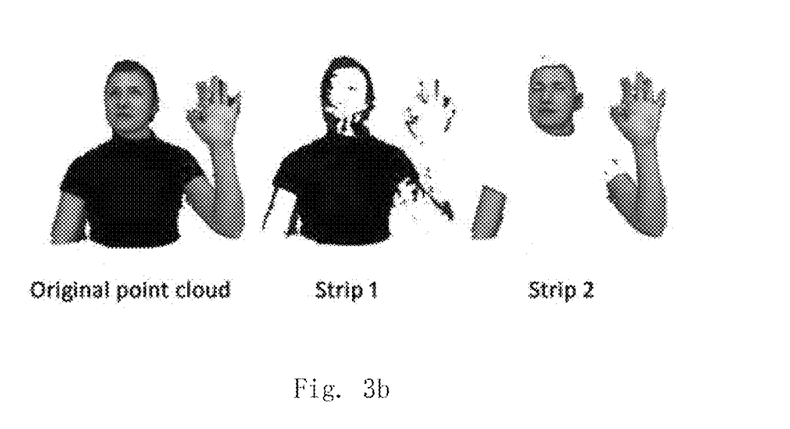

(2) Strip-Partitioning the Point Cloud:

As depicted in FIG. 2, each frame of point clouds is partitioned into a "strip-macro-block-block" hierarchy. The point cloud is carried out strip-partitioning to obtain a plurality of independent strips, and then macro blocks and coded blocks are partitioned for each strip independently. As shown in FIGS. 3a, b and c, Shiva_00035_vox12.ply and Sarah.ply is taken as examples to show how the point cloud is after strip-partitioning. After the two point clouds are partitioned into two strips, two independent strips are obtained, and each strip shows local information of the point cloud.

Facade_00015_vox14.ply is taken as an example, firstly, the strips are partitioned. The attribute information of all 279664 points in the point cloud are traversed, a point is classified into a strip 1 if the color values R, G and B of the point are less than 65, and the point is classified into a strip 2 if one of the color values R, G and B of the point is greater than or equal to 65. In this way, the original point cloud is partitioned into two strips, strip 1 with 93945 points and strip 2 with 185719 points. By setting different strip color thresholds, the point cloud can be partitioned into n independent strips.

(3) Partitioning Macro Blocks and Coded Blocks of The Point Cloud: The point cloud Facade_00015_vox14.ply is strip-partitioned to obtain two independent strips, followed by partition of the point cloud's macro-blocks and coded blocks, as shown in FIG. 2. Strip 1 of the point cloud Facade_00015_vox14.ply is taken as an example, it contains 93945 points, the macro block and the coded block are partitioned with a KD tree, the partition depth is set to 9, after partition, there are 256 macro blocks, each macro block comprises two coded blocks, thus 512 coded blocks are obtained, and the number of points in the block is 183 or 184.

Figure 4:
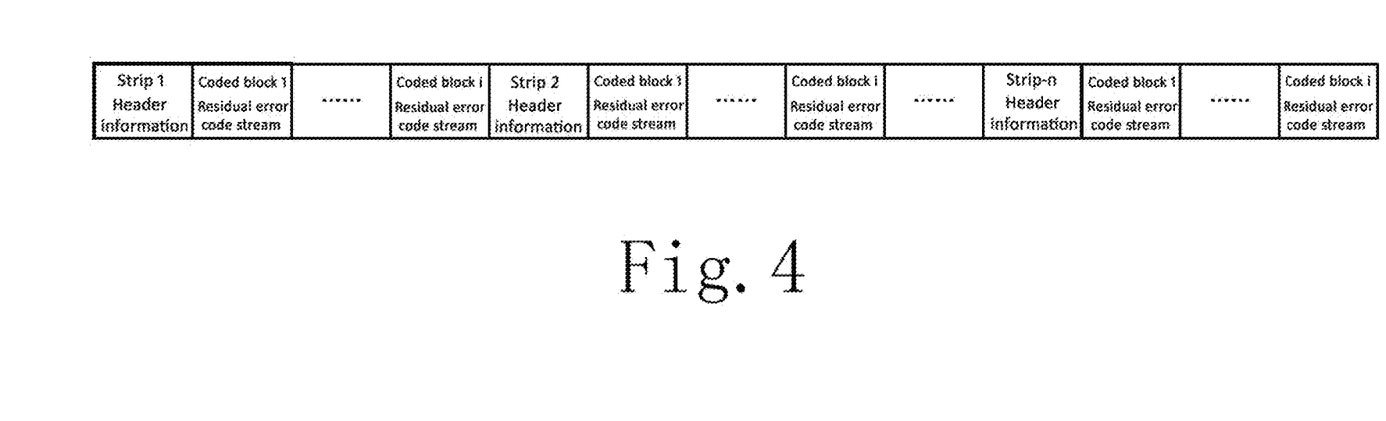
FIG. 4 is a diagram illustrating a code stream structure after point cloud attribute information compression.

(4) Generating a Point Cloud Attribute Compressed Code Stream:

Facade_00015_vox14.ply is taken as an example, aiming at 512 coded blocks of Facade_00015_vox14.ply, the color information in the blocks is subjected to intra-frame prediction, transformation, quantization and entropy coding processing in sequence, then written into the code stream file according to the sequence of strips in combination with the code stream information of prediction mode and transformation mode, and the structure of the final code stream file is as shown in FIG. 4. The performance of point cloud attribute compression is measured by the code rate in bpp (bits per point) and PSNR (Peak Signal to Noise Ratio) in decibel dB.

Figure 5A:
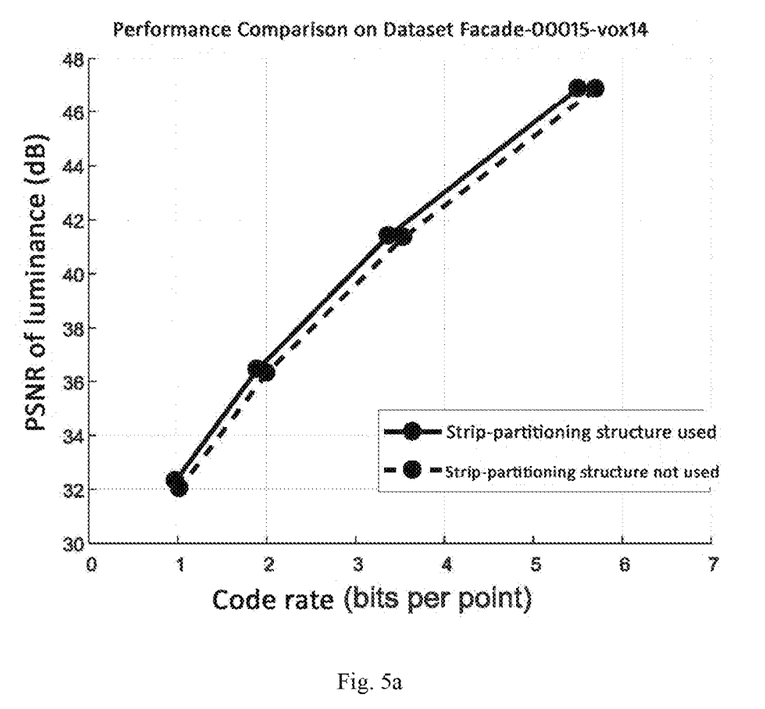
Figure 5B:
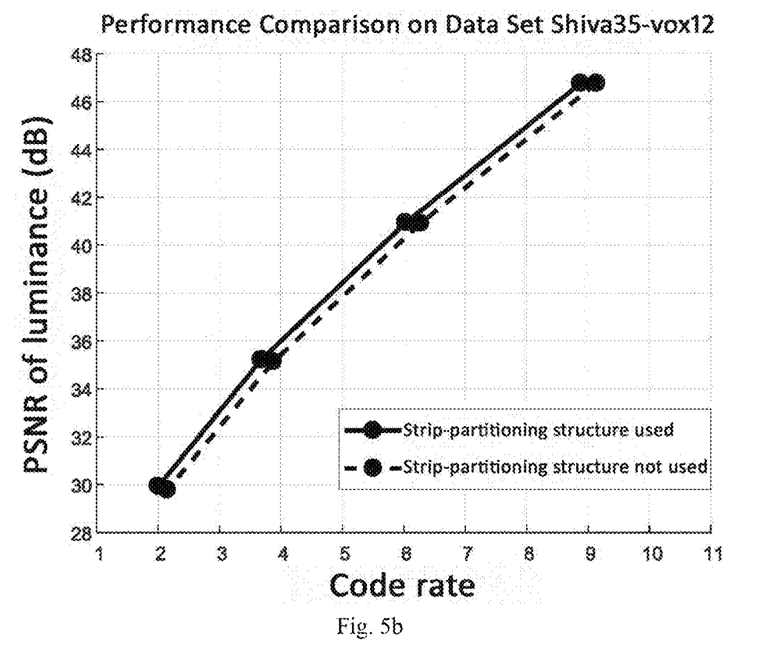
Figure 5C:
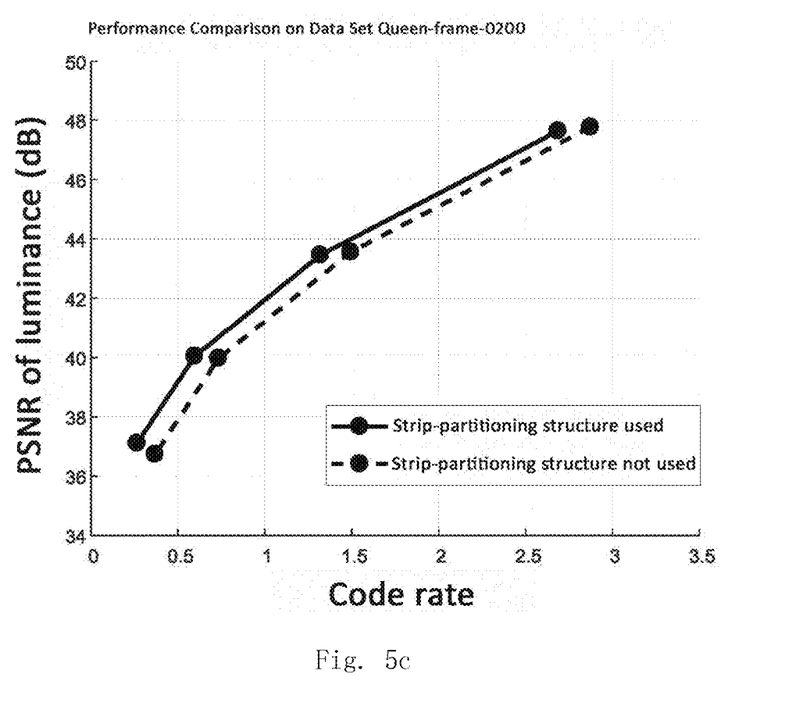

In order to verify the effect of the hierarchical partition-based point cloud attribute compression method of the present invention, experiments were conducted using the above three data sets Facade_00015_vox14.ply, Shiva 00035_vox12.ply, Queen_frame_0200.ply, and the compression performance was compared with the existing method as shown in FIGS. 5a, b, and c.

As can be seen from FIG. 4, in the case of using the same point cloud attribute compression encoder based on intra-frame prediction, graph transformation, quantization and entropy coding, after the compression structure based on hierarchical partition of the present invention is introduced, stable and significant performance gains are generated on three types of typical point cloud data tested, and random access can be supported. According to spatial position and color distribution of the point cloud of the method, one frame of point cloud is adaptively partitioned into a "strip-macro-block-block" hierarchy, each strip is independently coded, the coding efficiency is improved, the fault tolerance of a system is enhanced, the compression performance of the point cloud attribute is improved at each code rate point, the gain is stable, and the advantages are prominent.

It should be noted that the examples are disclosed to aid in a further understanding of the present invention, but those skilled in the art will appreciate that: various alternatives and modifications are possible without departing from the spirit and scope of the invention and the appended claims. Therefore, it is intended that the invention not be limited to the embodiments disclosed, but that the scope of the invention be determined by the claims appended hereto.

INDUSTRIAL APPLICABILITY

The invention belongs to the technical field of point cloud data processing, and relates to a point cloud data compression method, in particular to a point cloud attribute compression method based on hierarchical partition, which further improves the compression performance of point cloud attributes under the condition of considering the computational complexity. The fault tolerance of the system is enhanced, and the compression performance of the point cloud attribute is improved. It is widely used in the construction of city digital map, and plays a technical support role in many hot researches such as smart city, unmanned, cultural relics protection and so on.

The invention claimed is:

1. A point cloud attribute compression method based on hierarchical partition, wherein the method is aimed at point cloud attribute information and provides a new coding scheme based on hierarchical partition, a frame of point cloud is adaptively partitioned into a "strip-macro-block-block" hierarchy according to a spatial position and color distribution of the point cloud, each strip is independently coded, random access is supported, the coding efficiency is improved, the fault tolerance of a system is enhanced, and the compression performance of the point cloud attribute is improved; the method comprises the following steps:

1) inputting a point cloud:
   reading geometric information and attribute information of the point cloud to be processed for subsequent processing;
2) partitioning a point cloud KD tree:
   carrying out KD tree partition on the point cloud according to the geometric information, selecting a coordinate axis with the largest distribution variance in the position coordinate of the point cloud at each time as a partition axis, selecting a point with the coordinate size being a median value as a partition point, iteratively partitioning until the set KD tree depth is reached, and obtaining coded block units with almost the same number of points after KD tree partition;
3) continuity analysis of the point cloud attribute information:
   obtaining coded blocks after KD tree partition, calculating variance of color values in each block according to attribute information to judge whether the block is a flat block or not, analyzing continuity of point cloud attribute information by calculating the proportion of the flat block to all block numbers, and judging whether strip-partitioning is carried out or not;
4) strip-partitioning the point cloud:
   if the continuity of the attribute information of the point cloud is judged to be poor in the step 3), partitioning a plurality of strips, otherwise, one frame of point cloud is one strip; and setting corresponding partition conditions according to different application scenes and performance requirements, and partitioning a frame of point cloud into a plurality of independently coded strips;
5) partitioning macro blocks and coded blocks of the point cloud:
   carrying out KD tree partition on each strip according to the geometric information, selecting a coordinate axis with the maximum distribution variance in the point cloud position coordinate as a partition axis each time, selecting a point with the coordinate size being a median value as a partition point, and iteratively partitioning until the set KD tree depth is reached; a block obtained by the last layer of KD tree partition is a coded block of the point cloud; numbering the coded blocks according to a breadth traversal sequence, and the numbering is used as a sequence for later processing of the coded blocks; the block obtained on the upper layer of the root node partitioned by the KD tree is a macro block of a point cloud, and one macro block is a parent node of two coded blocks; and
6) intra-frame prediction, transformation, quantization and entropy coding:
   processing all coded blocks according to the coding sequence, transforming, uniformly quantizing and entropy coding the predicted residual error to obtain a final code stream compressed by the point cloud attribute.

2. The point cloud attribute compression method according to claim 1, wherein the point KD tree partitioning method in the step 2) is a binary partitioning method; N points of the point cloud to be processed is set, wherein the partition depth set by the KD tree is d, and $2^d$ blocks are obtained after the point cloud is partitioned d times; and all coded blocks are numbered by $b_1, b_2, \ldots, b_i, \ldots, b_{2^d}$ in an order of breadth traversal.

3. The point cloud attribute compression method according to claim 1, wherein the method for analyzing the continuity of the point cloud attribute information in the step 3) comprises the following steps: traversing and calculating the variance var (i) of the color values Ri, Gi, Bi in each block $b_i$ according to the breadth sequence, taking R as an example, firstly calculating the mean value $\overline{R}_i$ of the R color components of N points in the block $b_i$ by using formula 1, and then calculating to obtain the variance $var(i)\_R_1$ of the R of the block $b_i$ by using formula 2; by the same reasoning between G and B, obtaining $var(i)\_R_1, var(i)\_G_1, var(i)\_B_1$ and comparing them with the threshold of continuity thres_1; wherein, if var (i) of the three color components is greater than thres_1, it is determined that $b_i$ is a non-flat block, otherwise $b_i$ is a flat block; meanwhile, recoding the number of the non-flat blocks, and obtaining the number num of the non-flat blocks in all the blocks after finishing traversal;

partitioning the number num of non-flat blocks in all blocks by the total number $2^d$ to yield a proportion of (num)/($2^d$) which the non-flat block accounts for, i.e., ratio; comparing ratio to threshold thres_2: if (num1)/($2^d$) is greater than thres_2, the consistency of the attribute information of the point cloud is poor, and strip-partitioning is needed; on the contrary, it shows that the consistency of point cloud attribute information is good, and no strip-partitioning is needed.

$$\overline{R}_i = \frac{1}{N} \sum_{n=1}^{N} R_{in} \quad \text{(Formula 1)}$$

$$\text{var(i)}\_R = \frac{1}{N} \sum_{n=1}^{N} (R_{in} - \overline{R}_i)^2 \quad \text{(Formula 2)}$$

4. The point cloud attribute compression method according to claim 1, wherein partitioning the strip structure of the point cloud in the step 4), includes but is not limited to the following scheme: traversing attribute information for all points in the point cloud, partitioning the point with similar attribute information in the point cloud into strips, classifying the point into strips 1 if the color values R, G and B of the point being less than 65, and classifying the point into strips 2 if the color values R, G and B of the point being greater than or equal to 65, by which the original point cloud being partitioned into two strips; according to requirements of different applications and requirements of different types of point cloud processing, a frame of point cloud can be partitioned into a plurality of strips based on a hierarchical partition scheme.

5. The point cloud attribute compression method according to claim 1, wherein the KD tree partitioning method in the step 5) is a binary partitioning method; N points of the point cloud to be processed is set, wherein the partition depth set by the KD tree is d, and $2^d$ blocks are obtained after partitioning the point cloud d times; and all coded blocks are numbered by $b_1, b_2, \ldots, b_i, \ldots, b_{2^d}$ in an order of breadth traversal.

6. The point cloud attribute compression method according to claim 1, wherein the relation between the macro block and the coded block in the step 5) is as follows: each macro block can be continuously partitioned into two coded blocks, and the two coded blocks are called sub-blocks thereof; and at the same time the two adjacent coded blocks have the same parent block, i.e. the two coded blocks constitutes a macro-block.

7. The point cloud attribute compression method according to claim 1, wherein the details in step 6) are as follows:

(7-1) independently inputting each strip into a point cloud attribute compression encoder based on intra-frame prediction, transformation, quantization and entropy coding through processing in the steps 1) to 2); obtaining coded blocks with numbers and macro blocks which can be selectively used in the encoder through the step 3); obtaining prediction residual error and further prediction mode information of the prediction residual error through prediction; transforming, uniformly quantizing and binarizing the prediction residual error to obtain a code stream of attribute information, combining prediction mode information of the coded block, and entropy coding to obtain a final point cloud attribute compressed code stream;

(7-2) the code stream based on the hierarchically partitioned point cloud attribute information being mainly composed of the point cloud attribute information of each strip, wherein the point cloud attribute information of each strip being composed of compressed header information and coded block information; wherein the header information mainly comprises quantization step length and the like; the coded block information stream is arranged in the order of coded blocks in units of coded blocks, and each block mainly comprises prediction mode information and color residual information of the coded blocks; and (7-3) the performance of point cloud attribute compression being measured by bit rate and PSNR (Peak Signal to Noise Ratio), wherein the bit rate is in bpp (bits per point) and PSNR is in decibel dB; the smaller the bit rate, the larger the PSNR, the better the compression performance of point cloud attribute.

* * * * *